United States Patent
Wagner et al.

(10) Patent No.: US 7,703,272 B2
(45) Date of Patent: **\*Apr. 27, 2010**

(54) SYSTEM AND METHOD FOR AUGMENTING TURBINE POWER OUTPUT

(75) Inventors: Thomas Wagner, Troy, NY (US);
Carlos Cesar, Caracas (VE)

(73) Assignee: Gas Turbine Efficiency Sweden AB (SE)

( \* ) Notice: Subject to any disclaimer, the term of this patent is extended or adjusted under 35 U.S.C. 154(b) by 264 days.

This patent is subject to a terminal disclaimer.

(21) Appl. No.: 11/897,879

(22) Filed: Aug. 31, 2007

(65) Prior Publication Data
US 2008/0250769 A1    Oct. 16, 2008

Related U.S. Application Data

(63) Continuation-in-part of application No. 11/519,575, filed on Sep. 11, 2006.

(51) Int. Cl.
*F02C 7/00* (2006.01)
*F02G 1/00* (2006.01)
*F02G 3/00* (2006.01)

(52) U.S. Cl. ........................ 60/39.53; 60/775
(58) Field of Classification Search .................. 60/775, 60/39.53, 801, 39.54, 39.58, 39.55, 772; 134/23, 198
See application file for complete search history.

(56) References Cited

U.S. PATENT DOCUMENTS

| | | | |
|---|---|---|---|
| 3,976,661 A | 8/1976 | Brooker et al. | |
| 5,622,044 A | 4/1997 | Bronicki et al. | |
| 5,669,217 A | 9/1997 | Anderson | 60/39.05 |
| 5,868,860 A | 2/1999 | Asplund | |
| 5,899,217 A | 5/1999 | Testman | 134/104.4 |
| 6,012,279 A * | 1/2000 | Hines | 60/775 |
| 6,250,064 B1 | 6/2001 | Tomlinson et al. | |
| 6,389,799 B1 | 5/2002 | Hatamiya et al. | |
| 6,478,289 B1 * | 11/2002 | Trewin | 261/27 |
| 6,634,165 B2 * | 10/2003 | Tomlinson et al. | 60/39.3 |
| 6,644,935 B2 | 11/2003 | Ingistov et al. | |
| 6,718,771 B1 | 4/2004 | Kopko | |
| 6,805,483 B2 * | 10/2004 | Tomlinson et al. | 374/144 |
| 7,293,415 B2 * | 11/2007 | Hoffmann et al. | 60/775 |
| 7,353,656 B2 * | 4/2008 | Bolis et al. | 60/775 |
| 7,428,818 B2 * | 9/2008 | Hjerpe | 60/775 |
| 7,481,060 B2 * | 1/2009 | Haertel et al. | 60/775 |

(Continued)

FOREIGN PATENT DOCUMENTS

EP    0933502 A2    8/1999

(Continued)

*Primary Examiner*—William H Rodríguez
(74) *Attorney, Agent, or Firm*—DLA Piper LLP (US)

(57) ABSTRACT

A method and system augments shaft output of gas turbine engines that can be used in multiple modes of operation. The system comprises a washing unit capable of injecting atomized water into the gas turbine engine, thereby obtaining a release of fouling material from the at least one compressor blade; and at least one water injection unit capable of injecting atomized water into the air stream of the gas turbine engine's inlet duct or at the gas turbine, under the control of a computational fluid dynamic model, in order to increase a mass flow of said air flow, wherein the power output from said gas turbine engine can be augmented.

13 Claims, 14 Drawing Sheets

U.S. PATENT DOCUMENTS

| | | | |
|---|---|---|---|
| 7,520,137 B2 * | 4/2009 | Hoffmann et al. | 60/775 |
| 2003/0133789 A1 | 7/2003 | Kuesters et al. | |
| 2003/0209256 A1 | 11/2003 | Tadayon | 134/10 |
| 2006/0060218 A1 | 3/2006 | Lakdawala et al. | |

FOREIGN PATENT DOCUMENTS

| | | |
|---|---|---|
| EP | 1203866 A2 | 5/2002 |
| EP | 1205640 A2 | 5/2002 |
| EP | 1489269 A2 | 12/2004 |
| GB | 94 20 362.8 | 3/1995 |
| GB | 100 10 117 A1 | 9/2000 |
| JP | 58 158906 A | 10/1983 |
| JP | 2000 104562 A | 4/2000 |
| JP | 2000 274206 A | 10/2000 |

* cited by examiner

SYSTEM AND METHOD FOR AUGMENTING TURBINE POWER OUTPUT

CROSS-REFERENCE TO RELATED APPLICATIONS

This application is a continuation-in-part application of U.S. patent application Ser. No. 11/519,575, filed Sep. 11, 2006 and entitled "System and Method for Augmenting Turbine Power Outlet," the contents of which are hereby incorporated by reference.

FIELD

The present invention generally relates to the field of gas turbines. In particular, the present invention relates to a system and method for high pressure compressor washing in combination with a water delivery apparatus for increasing the mass flow and thereby, power output of a gas turbine, whereby the system is controlled using a predetermined computational fluid dynamic transfer model.

BACKGROUND

Generating power requires that gas turbines consume large quantities of air. Gas turbines are strongly dependant on the ambient air conditions for their performance. Ambient air conditions such as temperature, pressure and water content impact the gas turbine's compressor's capability to compress the air and thereby affects its performance. In other words, gas turbine power is a function of the total mass flow available for compression, in combination with fuel and expansion to drive a turbine section. Mass flow is directly proportional to the engine power output. Gas turbines are constant volume machines (i.e., they operate according to fixed geometries), and thus, air density is one parameter that plays an important role in a gas turbine's ability to generate power. Air temperature and air density are in direct correlation to one another. As air temperature increases the density of air decreases, thereby resulting in a decrease of the overall potential for mass flow. As mass flow decreases, the output of the gas turbine also decreases. Other key parameters that have a strong impact on the performance of the gas turbine include the pressure ratio and the compression efficiency.

Mass flow can be managed by manipulating the water vapor content at the air intake of the gas turbine. Thus, air can be saturated with water vapor to return the overall mass flow to the maximum level of the turbine's design. Saturation can result from simply saturating the air surrounding the gas turbine. Alternatively, a more aggressive approach to increasing overall mass flow is injecting water into the turbine's compressor or combustor to oversaturate the air. Oversaturation allows the heat of fusion to further pressurize the working fluid and increase the turbine's output to a level above saturated air output levels.

However, proper saturation of air can be problematic because of the range of temperatures encountered by the gas turbine throughout a given time period (i.e., temperature changes over a 24 hour period or over an annual time period). As a result of these temperature variances, the water requirement for saturation will vary accordingly. For a given weather and engine load situation, a corresponding amount of water is necessary to reach saturation or oversaturation. Thus, humidity detection and pumping equipment are used in providing the proper amount of water for the appropriate level of saturation or oversaturation. Using too much water results in "overspray," where the air can not absorb/hold the excess water. The excess water can harm operations by corroding and/or flooding the gas turbine's air duct. On the contrary, too little water will not saturate the air and the full mass flow increase effect will not be accomplished.

Another issue is the build up of fouling or foreign particles in the turbine, particularly in the compressor, which can affect the gas turbine's efficiency and therefore its power output. Machines, such as gas turbines, consume large quantities of air. Air contains foreign particles in the form of aerosols and small particles, which typically enter the compressor and adhere to components in the compressor's gas path. Compressor fouling changes the properties of the boundary layer air stream of the gas path components because the deposits increase the component surface roughness. As air flows over the component, the increase of surface roughness results in a thickening of the boundary layer air stream. The thickening of the boundary layer air stream negatively effects the compressor's aerodynamics. At the blade's trailing edge, the air stream forms a wake. The wake is a vortex type of turbulence that has a negative impact on the air flow. The thicker the boundary layer the stronger the wake turbulence. The wake turbulence together with the thicker boundary layer has the consequence of reducing mass flow through the engine. The thick boundary layer and the strong wake turbulence result in a reduced compression pressure gain, which in turn, results in the engine operating at a reduced pressure ratio. A reduced pressure ratio results in a lower efficiency of the engine. Further, fouling of the compressor reduces the compressor isentropic and polytrophic efficiency. Reduced compressor efficiency means that the compressor requires more power for compressing the same amount of air. As a result, the power required for driving the compressor increases and results in less surplus power being available to drive the load.

Washing the gas turbine counteracts the fouling and can be conducted either with the engine being shut down or during its operation. In the former instance the engine shaft can be cranked using its starter motor while wash water is injected into the compressor. Fouling is released by the act of the chemicals and the mechanical movement during cranking. The water and the released fouling material are transported to the exhaust end of the engine by the air flow. This procedure is called "crank" washing or "off-line" washing. An alternative to off-line washing is "on-line" washing where the engine is washed while in operation. "On-line" or "fired" washing occurs as the engine is firing fuel. The washing water is injected into the compressor while the rotor is spinning at high speed. Due to high rotor speeds and short retention time for the water this wash is not as efficient as the crank wash, but allows washing during operation.

Typically, attempts to augment gas turbine power have utilized extensive instrumentation throughout the entirety of the turbine for measuring temperatures, displacement, pressures and loading levels of the machine. However, power augmentation that relies on such extensive instrumentation is problematic due to its expense, complication of use, and increase in the potential and likelihood for the occurrence of operational errors resulting from instrumentation inconsistencies or failure. Eliminating such reliance on complex and extensive instrumentation to augment power of a gas turbine is desired.

Thus, there exists a need in the industry for a method and apparatus for augmenting the power output of gas turbine engines including, but not limited to, a stationary gas turbine engine, over a wide range of operating conditions where the system is controlled using a computational fluid dynamic transfer model.

SUMMARY

An exemplary system for augmenting power output from a gas turbine comprises:
  (a) a pump unit, with or without variable frequency control, with a preferred configuration of a positive displacement pump;
  (b) a control unit connected to the pump unit, which will pre-fill injection arrays to avoid power surge at start-up, the control unit regulating the operation of the pump unit according to a predetermined combined cycle deck and computational fluid dynamic analysis based on at least one defined parameter to form a control model;
  (c) a washing unit connected to the pump unit, the washing unit comprising at least one nozzle and at least one valve for controlling a water flow rate fed to the at least one nozzle;
  (d) at least one water injection unit connecting to the pump unit, the at least one water injection unit comprising at least one nozzle and at least one valve for controlling a water flow rate fed to the at least one nozzle; and
  (e) a weather monitoring unit connected to the control unit, wherein the weather unit indicates at least one of the at least one defined parameters;
  (f) an array comprising at least one fully captivated nozzle and nozzle support structure;
  (g) an inlet duct treatment design to protect non-corrosive resistant inlet ducts due to contact with fogging condensate.

The features that characterize the various aspects of the disclosure, both as to organization and to method of operation, together with further objects and advantages thereof, will be better understood from the following description used in conjunction with the accompanying drawings. It is to be expressly understood that the drawings are for the purpose of illustration and description and not intended as a definition of limits.

BRIEF DESCRIPTION OF THE DRAWINGS

In the following detailed description, reference will be made to the accompanying drawings, of which.

DETAILED DESCRIPTION

Gas turbines have found a wide variety of uses such as power generation, gas compression and many other mechanical drive applications. The various aspects presented herein can be utilized with any type of gas turbine, however for convenience; it is described with respect to a gas turbine in a power station service. The necessary adjustments for application to other types of appropriate turbines are readily understood by one skilled in the art.

Figure 1:
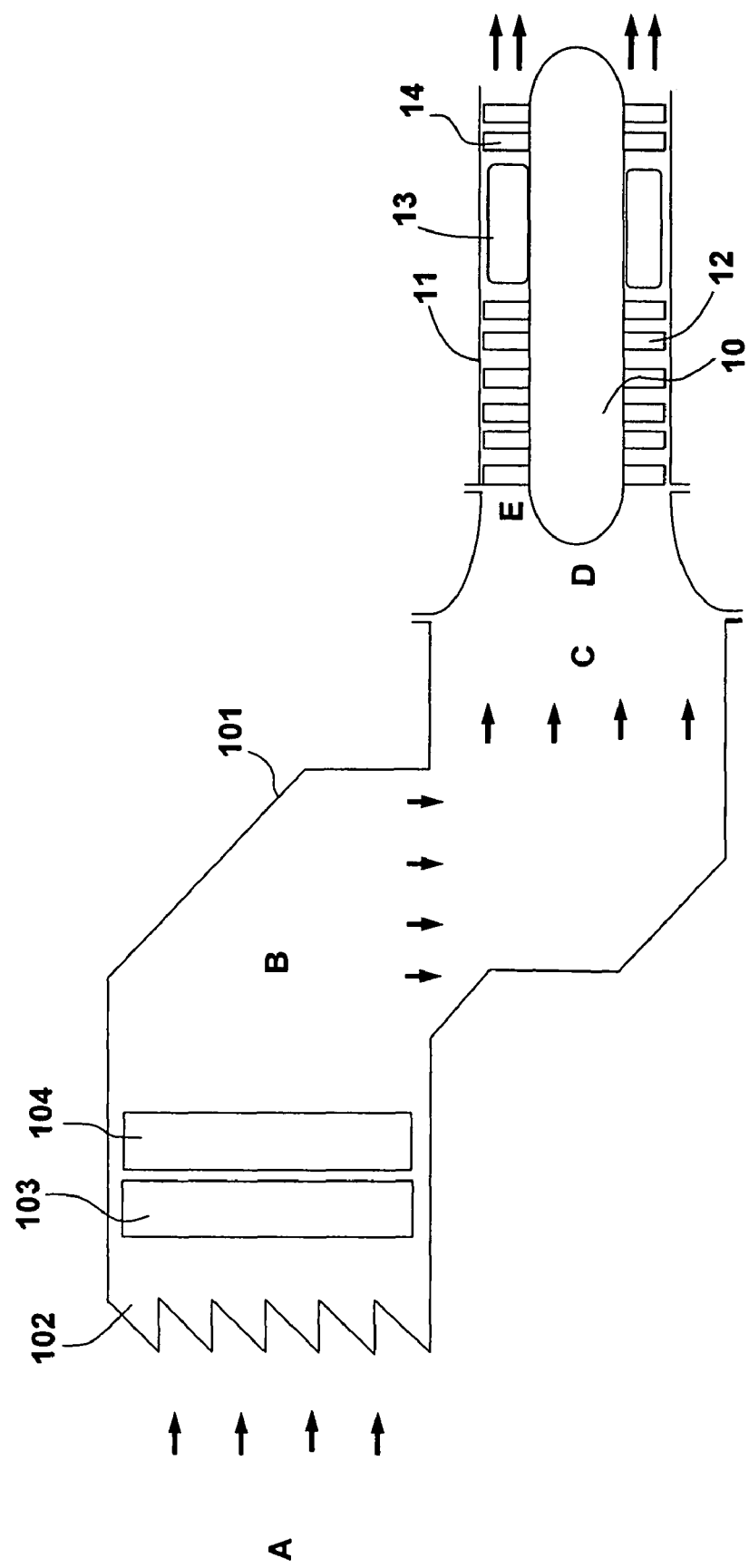
FIG. 1 depicts an exemplary diagram of a representative air inlet of a gas turbine.

FIG. 1 shows a representative configuration of the inlet air section of a gas turbine. Arrows depict the direction of the air flow. Ambient air enters the duct 101 via the weather louver 102, via the trash screen 103, and via the air filter 104 to the inlet of the gas turbine 10. The gas turbine 10 comprises a rotor with blades and an outer casing 11. At the front end of the shaft, the compressor blades 12 compress the air to high pressure, for example, typically 10 to 30 times the air's typical pressure. The compressed air is delivered to a combustor 13. Fuel (not shown) is fired in the combustor 13. The hot combustion gases expand through turbine 14 and leave the plant through an exhaust duct (not shown). The turbine power output is greater than the compressor power requirement, causing power to be available on the shaft. The surplus power is used for driving loads such as a generator, a pump, a compressor, a propeller, or the like.

The flow of ambient air A past the weather louver, trash screen and filter typically has a velocity ranging from about 10 meters/second to about 20 meters/second, more typically about 10 meters/second. The air moves from area B and into area C while generally maintaining it velocity. The air enters area D, which is the inlet plenum section of the gas turbine. The inlet plenum 19 is shaped as a bell mouth in this embodiment as to allow for acceleration of the air. The inlet plenum 19 is not limited to a bell mouth shape and other shapes may be employed. Struts (not shown) may be disposed along the inlet plenum 19 before the compressor inlet face E and the compressor blades 12. At the compressor inlet face E, the air velocity typically ranges from about 0.4 mach to about 0.6 mach, more typically a velocity that is about half the speed of sound or about 180 m/s. The air is accelerated to obtain the high velocity required by the compressor to accomplish the compression work. Typical air compression ratios range from about 9:1 to about 25:1. Once inside the compressor, the air velocity is reduced as a function of the higher density resulting from compression. The compressed air is then delivered to the combustor. When passing into the combustor chamber velocities are typically less than 100 m/s, although other velocities may be provided as desired.

Disclosed is a method and system for augmenting shaft power output of gas turbine engines and for gas turbine washing that can be used in multiple modes of operation. The gas turbine engine's power is generally augmented by increasing air density, and thus air mass, by injecting a liquid into the machine to manage mass flow. The liquid is typically water, but can be supplemented with alcohol or antifreeze to depress the freezing point of the liquid. In addition to increasing the air mass flow, water provides environmental benefits such as reduced emissions. The amount of water injected into the turbine's mass flow is based on a programmed control model. The control model is determined by using a cycle model and a computational fluid dynamic analysis (CFD).

Figure 2:
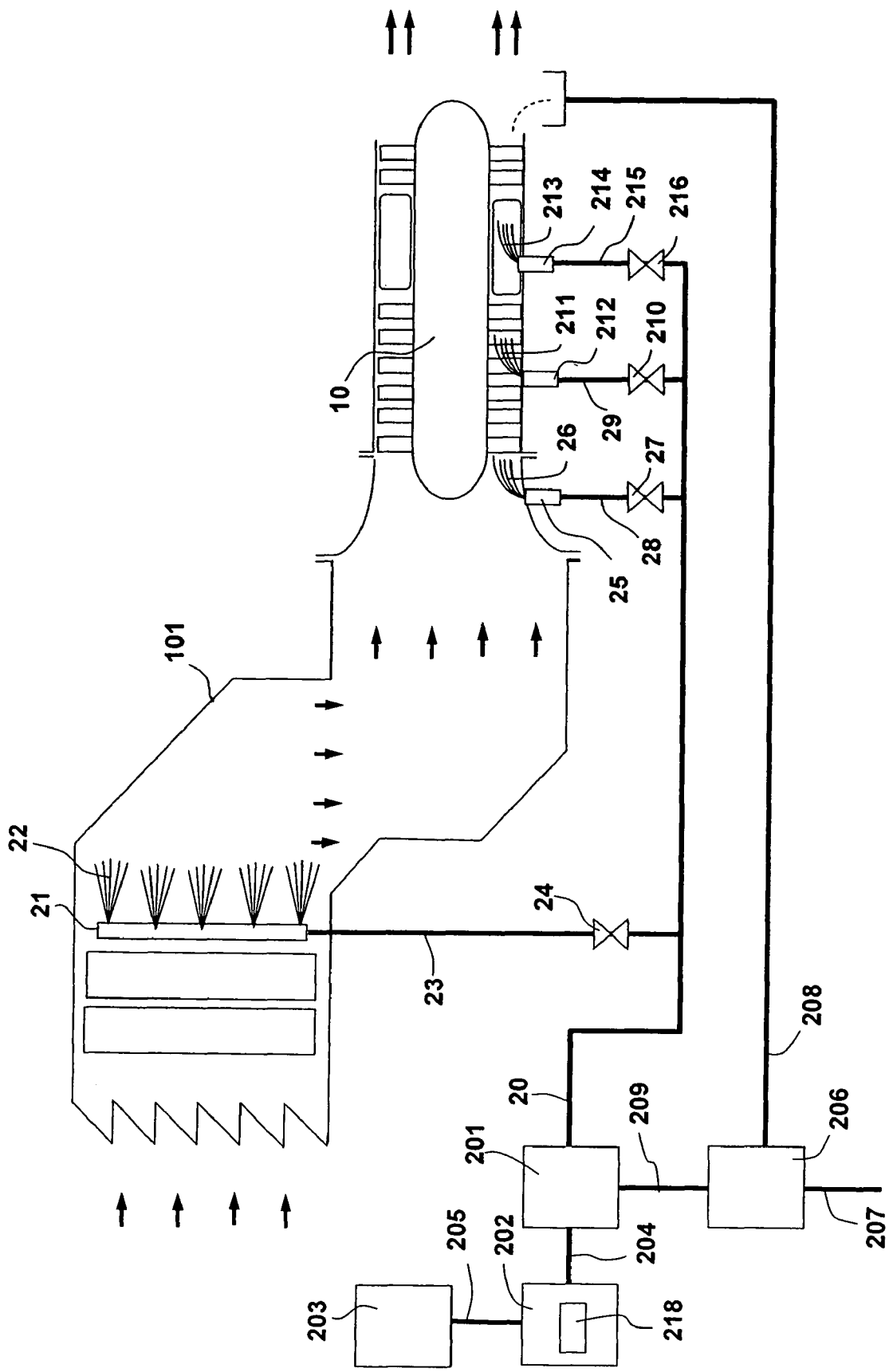
FIG. 2 depicts an exemplary diagram in accordance with an embodiment.

More particularly, a system for washing a gas turbine and augmenting its power output is disclosed. With reference to FIG. 2, the system typically comprises (a) a pump unit 201 comprising at least one variable speed pump, such as a speed pump with a positive displacement design, for increasing a water pressure; (b) a control unit 202 connected to the pump unit 201 by a first signal feed 204, which controls the speed/operation of the pump unit 201, whereby the control unit 202 employs predetermined cycle deck and computational fluid dynamic analysis to form a control model based on at least one defined parameter comprising ambient weather conditions, turbine geometry, velocity field of air movement and specifications of particular turbine components; (c) a washing unit connected to the pump unit 201 by a feed line, the washing unit comprising at least one nozzle and at least one valve connected to the pump unit by the feed line and to the at least one nozzle by a conduit and control a flow rate of water being fed to the at least one nozzle, the at least one nozzle of the washing unit being adapted to emit a spray of atomized water so as to impinge on and wet at least one compressor blade, thereby obtaining a release of fouling material from the at least one compressor blade; and/or (d) at least one water injection unit comprising at least one nozzle and at least one valve connected to the pump unit by the feed line and to the at least one nozzle by a conduit and being adapted to control a flow rate of water being fed to the at least one nozzle, the at least one nozzle of the water injection unit injects a spray of atomized water into an air stream of the turbine inlet duct, thereby increasing the mass flow of the air stream, wherein the power output from the gas turbine engine is augmented.

Embodiments also comprise (e) a weather monitoring unit 203 (depicted in FIG. 2) connected to the control unit 202 by a signal 205, where ambient conditions that affect the gas turbine's performance can be measured and reported to the control unit 202 from a model developed by using a cycle deck model and for computational fluid dynamic analysis to establish a basis for scheduling of the proper quantity of water to deliver a target level of inlet air saturation. The ambient conditions comprise environmental factors that may influence the operation of the gas turbine, including but limited to, temperature, humidity and air pressure. In one embodiment, each of temperature, humidity and air pressure are monitored. The weather monitoring unit 203 (details not shown) comprises a dry bulb thermometer and an air humidity measuring device in one exemplary embodiment. In other alternative embodiments, the weather monitoring unit 203 can comprise a dry bulb thermometer and a wet bulb thermometer. In another alternative embodiment, the weather monitoring unit 203 may comprise a barometric pressure measuring device. In still other embodiments, for ambient pressure measurements, the weather monitoring unit may comprise other components and/or combinations of components well known to those in the art to monitor and/or measure ambient weather conditions. The weather information is processed by the control unit 202, where the control unit 202 delivers to the operator key operational information such as allowable evaporation water quantity, icing risk, etc.

The pump unit 201 can comprise a single pump (if the pump unit 201 is appropriately engineered for that service), one variable speed pump (where the speed is governed by frequency and where the appropriate frequency is set by a frequency controller) or multiple parallel pumps, for example, typically 5 pumps in certain embodiments, each one with different flow capacities. By running one, two or more pumps in different combinations a very large range of pump capacities is accomplished. The pumps may also be a positive displacement design with a transmitter to indicate flow to the control unit 202 for looped control.

FIG. 2 depicts pump unit 201 (details not shown) comprising a pump for prefilling the power augmentation array using low pressure and a pump to pump water to a high pressure for delivery of scheduled water injection for power augmentation. The low pressure prefill pump is used to make the overall augmentation solid with water to all a consistent water supply at the start of power augmentation and thereby avoid power surging. The pressurized water emanating from the pump unit is fed to a feed line (a.k.a. pipe header). The pipe header acts as a distributor of the high pressure water to different users such as the evaporative cooling system, the wash system, the compressor intercooling system, and the combustor flame cooling system. The pump unit can comprise a displacement type pump driven by a frequency controlled electric AC motor, where the frequency governs the pump speed. Alternatively, the pump unit can comprise a motor such as a DC motor, where the motor current governs the pump speed. Other suitable pump units are well known to those skilled in the art. In certain embodiments, the pump raises the water pressure to a maximum of about 80 bar, typically about 35 bar, more typically about 70 bar, although as should be understood, other values may also be provided where desired. The pump's maximum capacity is set in relation to the rated gas turbine's air flow. The pump's capacity is sized according to the ratio of water flow and air mass flow, where the water flow is the nominator and air flow the denominator. In certain embodiments, the ratio typically ranges from about 0.3 to about 0.5 when the water is expressed as liters/minute and air flow as kg/seconds; in other embodiments, the ratio ranges may be different.

In addition, for washing purposes the use of heated water (e.g., for compressor washing) and chemicals (e.g., for use as washing detergents or as compressor corrosion inhibitors at completion of an operating period) can be advantageous. Therefore, the pump unit 201 can further include tanks and heaters (i.e., for providing heated water) as well as a chemical injection unit for injecting chemicals into the water.

The pump unit 201 can be connected to a water collection unit and a water processing unit (i.e., capable of purifying water) 206 by a conduit 209, since waste water emanates from the gas turbine engine during washing and/or power augmentation. The water processing unit 206 can comprise particle separation filters and de-ionization filters. For example, the waste water can be in the form of water vapor through the stack or may be produced in a condensed form, where in the case of off-line washing, wash water will flood out from the gas turbine's engine compressor discharge drain. This waste water contains any released fouling material as well as oils, fats and metal ions coming from the gas turbine engine itself. This water is typically hazardous and preferably must be collected and treated or released to a controlled drain. Water may also show up in the inlet air duct when evaporative spray cooling is practiced. This water can be collected by the water collection unit and treated in the water processing unit 206. Alternatively, the water processing unit 206 can also process raw water from a water source (not shown in the FIGS.) supplied via conduit 207. The purified water is fed to pump unit 201 via conduit 209. The treated waste water can be recycled and re-used for washing, thereby providing a closed loop system with no water emissions. Further, the re-used water reduces the total water consumption.

The water processing unit 206 purifies the water to "demineralized" water quality so that the water is suitable for injection into the gas turbine's air mass path where the total dissolved solids ranges, in certain embodiments, from about 1-5 ppm. Suitable water purifier systems are known to those skilled in the art.

Pump unit 201 is controlled by a control unit 202. The control unit 202 can be controlled from a control room or from a panel by the pump unit 201, as examples. The control unit 202 comprises manual controls as well as programmable controls that enable operation of the pump unit 201 via a signal feed 204. The control unit 202 includes a storage means 218. The storage means 218 can include a random access memory (RAM) and/or a non-volatile memory such as read-only memory (ROM). One of ordinary skill in the art readily understands that a storage means can include various types of physical devices for temporary and/or persistent storage of data including, but not limited to, solid state, magnetic, optical and combination devices. For example, the storage means may be implemented using one or more physical devices such as DRAM, PROMS, EPROMS, EEPROMS, flash memory, and the like. The storage means 218 can further comprise a computer program product including software code portions for performing the method steps in accordance with embodiments when the computer program product is run on the computer device, for example, controlling an opening degree of a valve in order to, in turn, control a water flow rate being supplied to at least one nozzle and implementing a water injection schedule defined by the cycle deck and computational fluid dynamics control transfer scheduling to form the control model. Additionally, the control unit 202 may monitor the flow scheduled in comparison to the actual flow delivered. In the event the actual flow is below an expected level, a blocked nozzle warning may be provided to the operator. In the event the actual flow is greater than the flow scheduled, a check for leaks warning may be provided to the operator.

When the power augmentation system is called for operation, a pre-fill pump may be activated by the control unit 202 to fill an augmentation injection nozzle array with water. This step is taken to avoid a discontinuous power step.

Additionally the pipe header 20 and all the conduits (for example, 28, 29, and 215) can comprise a hydraulic type high pressure flex hose, thus simplifying installation. Alternatively a fixed pipe may be installed. The valves (for example 24, 27, 210 and 216) can be opened or closed from the control room or other remote location(s). Alternatively, the valves may be manually opened or closed.

The control unit 202 can also be used to implement computational fluid dynamic transfer analysis (CFD). CFD allows for prediction of (i.e., formulation of a model) the amount of water needed to be injected into the gas turbine engine to fully saturate or oversaturate the air. CFD provides for a computational model representing the system in accordance with embodiments. Subsequently, the dynamics of the fluid flow through the system can be analyzed and predicted in light of one or more of the defined parameters including, but not limited to, the ambient weather conditions and specific parameters pertaining to the gas turbine (i.e., turbine geometry and the velocity field of air movement) and load-limiting design aspects of the turbine (i.e., compressor blades, engine casing, combustor components and hot gas path working elements). CFD provides a control model that is interpreted and implemented by a programmed logic controller (PLC) for adjusting the level of water injection. The defined parameters or boundaries can be input into the system according to embodiments either manually or automatically by the use of various sensors and/or weather monitoring units. CFD provides simulated fluid flow and, thus, a predicted gas turbine performance level, which corresponds to the air mass flow through the turbine. As a result of the generated model, embodiments can adjust the level of water injected on a continual basis or intermittent basis so that the power output of the gas turbine is optimized. The basic CFD process comprises, in one exemplary embodiment, defining the geometry of the gas turbine; determining the volume occupied by the fluid (e.g., water vapor) where the volume is divided into discrete cells (where the totality of the cells form a mesh); defining the boundary conditions such as the particular properties of the fluid utilized (i.e., for those processes that undergo substantially constant changes regarding the defined boundaries, the initial boundaries are typically defined); employing algorithms and equations (i.e., computer software or a computer loadable product loadable onto a digital computing device) for calculating predicted results; interpreting the predicting results to form a model.

Typically for full saturation, injection into the gas turbine inlet is in the form of a finely divided spray having droplets ranging in size from about 10 to about 50 microns, although as should be understood, droplets of other sizes may be utilized as well where desired. When saturating the air, the CFD-generated model defines the air mass flow input into the gas turbine to preserve the gas turbine's power output.

Alternatively, embodiments may provide for oversaturation of the air, thereby resulting in higher air mass than is found with full saturation. In this instance, an additional computational fluid dynamic model preferably considers the position in the gas turbine engine at which the water is injected as well as the specific loading of the machine created by the oversaturation mass flow. The injection points can include, but are not limited to, those as described herein associated with evaporative cooling, compressor intercooling, combustor flame cooling or engine wash, as examples. When oversaturating the air, the model defines the air mass input into the gas turbine while the gas turbine components are defined to place restrictions of the water injection levels so that the air mass flow is within the acceptable limitations of the gas turbine engine's design. Subsequently, ambient weather conditions and gas turbine load demands can be input into the programmed logic controller.

The programmed logic controller acts in accordance with the control model in regulating the mass air flow through the gas turbine engine. More specifically, the program logic controller regulates the flow of water for its use in power augmentation and/or washing by operating the pump unit 201 to a specific pressure, and also by regulating the particular nozzle(s) utilized for each purpose. Moreover, for power augmentation, at least one nozzle is activated or deactivated to achieve the proper flow rate in accordance with the CFD model so that it matches the power demand and the ambient weather conditions. Thus, the CFD model and programmed logic controller provide either for air saturation or oversaturation. When power augmentation is initiated, the control unit 202 calculates the water injection level based upon the calculated air flow from the cycle model prediction. This air flow is then used to calculate the target relative humidity level to define the amount of water to inject. The calculation is then cycled as water is scheduled to allow a convergence of water injection rate to a stable flow.

Figure 3:
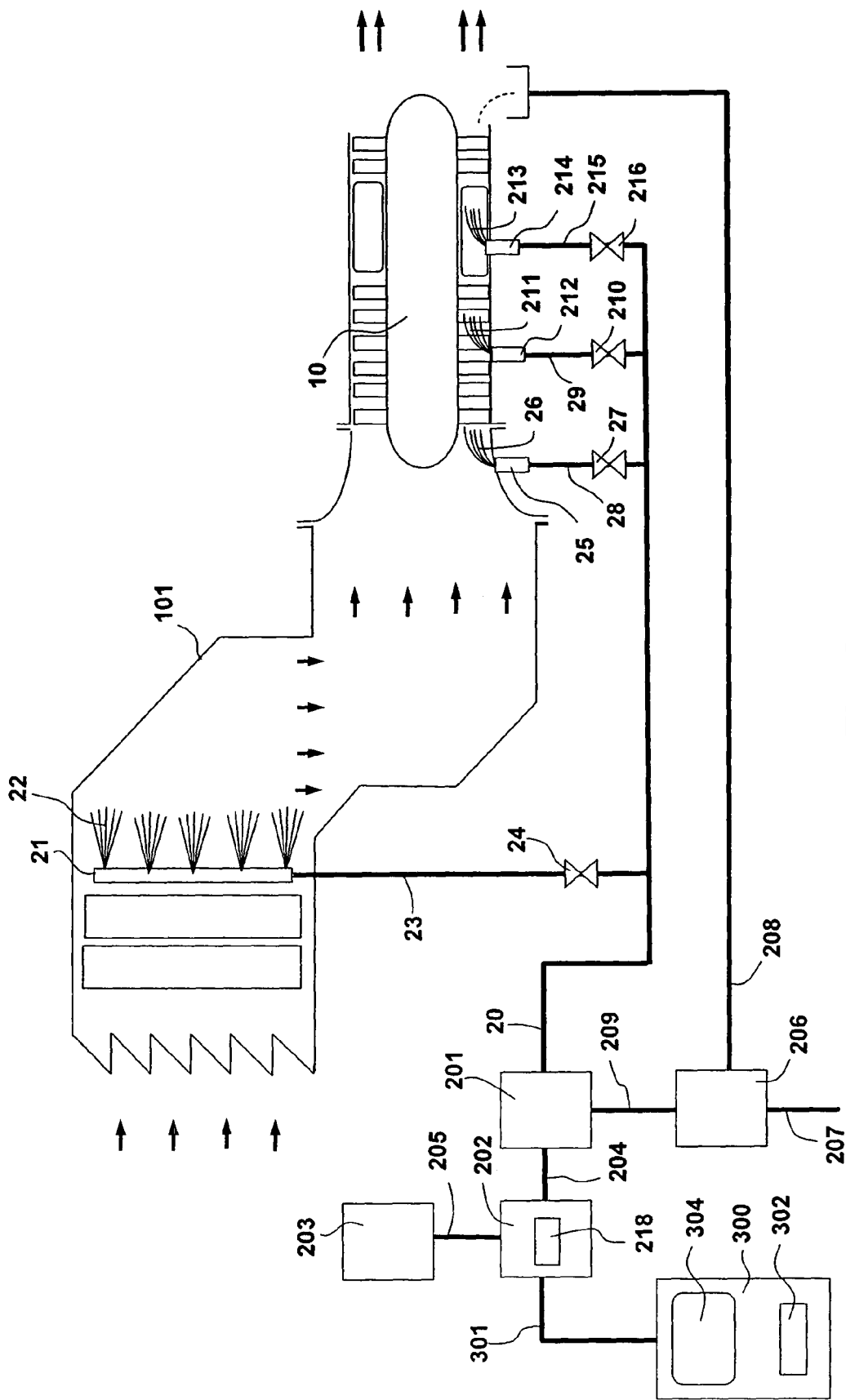
FIG. 3 depicts an exemplary diagram in accordance with an embodiment.

The embodiments can further comprise an operator unit 300, as depicted in FIG. 3, that may be installed in a control room and connected to the control unit 202 by a signal feed 301. The control unit can include an input device including, but not limited to, a keyboard 302, which allows the operator to input system commands such as, for example, control commands for the pump unit 201. A display, monitor or screen 304 can be used for presenting information relating to operating the pump unit 201 such as, for example, the time history of the operating parameters or status information of the pump. Accordingly, the operator can monitor the operation of the pump as well as different operating parameters.

Alternatively, the display 304 can be a touch sensitive screen having, for example, a number of soft-keys arranged on the screen in order to present different commands at different presented interfaces on the display. The operator unit 300 can further comprise the storage means (not shown) such as those described above.

According to an embodiment, both the wash unit and the at least injection unit comprise at least on nozzle and at least one valve. The wash unit water supply sub-system can create de-ionized water from a potable supply and distribute it to a water holding tank for use as either washing fluid or for power augmentation. For example, the wash unit can employ, but is not limited to, a reverse osmosis system providing water having a total dissolved solids ranges, as an example, from about 1-5 ppm. The wash unit and at least one injection unit can either be installed in the gas turbine as separate units or the wash unit may also serve as one of the at least one injection units. The at least one nozzle (e.g., from 1-10 nozzles) can be used to spray water into the compressor and into the combustor. The at least one nozzle may be positioned within the inlet air section and between the struts. This nozzle positioning may reduce wetting of walls of the bell mouth inlet plenum 19 and the struts. The at least one nozzle can be coupled to a ring feeder where the at least one nozzle opening is directed into the engine, including being installed in the inlet duct area as well as in the compressor and combustor. A hose (e.g., a high pressure flex hose) can be connected to both the ring feeder and a water container (i.e., the water container can include, but is not limited to, a ground-supported container or other appropriate water source), from which the water supply can be remotely controlled. Alternatively, the hose can be connected to a ground-stationed vehicle, whereby the washing procedure can be controlled remotely from various locations, for example the ground-stationed vehicle or from the control room of a stationary gas turbine plant.

Typically, the at least one nozzle provides quantities of finely divided water into and through the gas turbine, either for washing or increasing the mass flow. The water can be finely divided such that the water droplets follow the same flow route as the mass flow. When washing, the water droplets follow the same flow route as that taken by the air-borne contaminants that have fouled the gas turbine.

Typically, in an exemplary embodiment, the washing unit operates at a pressure of about 10 to about 80 bar, and more typically about 50 bar to about 80 bar, although the washing unit may operate at any other pressures where desired. The water spray droplets according to certain embodiments typically have a diameter of about 80-250 µm (on a means mass basis) and velocities ranging from about 40-240 meters/second (a flow rate from about 0.2 to about 240 liters/minute). In other embodiments, the diameters and/or velocities of water spray droplets may be provided with different values as may be desired. For example, the at least one nozzle of the washing unit can be supplied with 0.1 liter of water/second for about 30 seconds at a pressure of about 70 bars, wherein the water droplets have a size (diameter) of about 150 µm. In certain embodiments, typically the total volumetric water flow is within the range of about 0.2 to about 240 liters/minute, while in other embodiments the total volumetric water flow may occur within different ranges. When several nozzles are utilized in the washing process, the water volumetric flow applies for all nozzles together. U.S. Pat. No. 5,868,860 to Asplund discloses an example of the use of high water pressure for washing of gas turbine compressors and is incorporated herein by reference in its entirety.

In an exemplary embodiment, typically, the at least one injection unit operates at a pressure of about 50 bar to about 160 bar, more typically about 80 bar to about 140 bar. The water spray droplets typically have a diameter of about <10 to about 20 µm, more typically about <10 to about 15 µm and particle velocities ranging from about 20 meters/second to about 80 meters/second. For example, the at least one nozzle of the at least one injection unit can be supplied with 0.1 liter of water/second for about 6 hours at a pressure of about 120 bars, wherein the water droplets have a size (diameter) of about 10 µm. Typically the total volumetric water flow is within the range of about 4 liters/minute. When several nozzles are utilized in the injection process, the water volumetric flow applies for all nozzles together.

The spraying or injecting of the finely divided water is indicative of the method used to increase the mass flow. FIG. 2 shows the air inlet to the gas turbine described in FIG. 1. FIG. 2 shows the application of an evaporative cooling system, a wash system, a compressor intercooling system and a combustor flame cooling. The evaporative cooling system is a "fogging" system where water is sprayed at the air inlet as a mist of fine droplets (fog) that evaporates. The wash system is a system for spraying water into the compressor inlet. The compressor inter-cooling system is a "wet compression" system for spraying water into a high density air stream at a compressor inter-stage. The combustor cooling system is a system for spraying water into the combustor.

In certain embodiments, evaporative cooling, compressor intercooling, combustor flame cooling or engine wash are seldom performed according to a fixed schedule. For example, as the air temperature changes, such as by the hour, the feasibility for evaporative cooling also changes.

Figure 4:
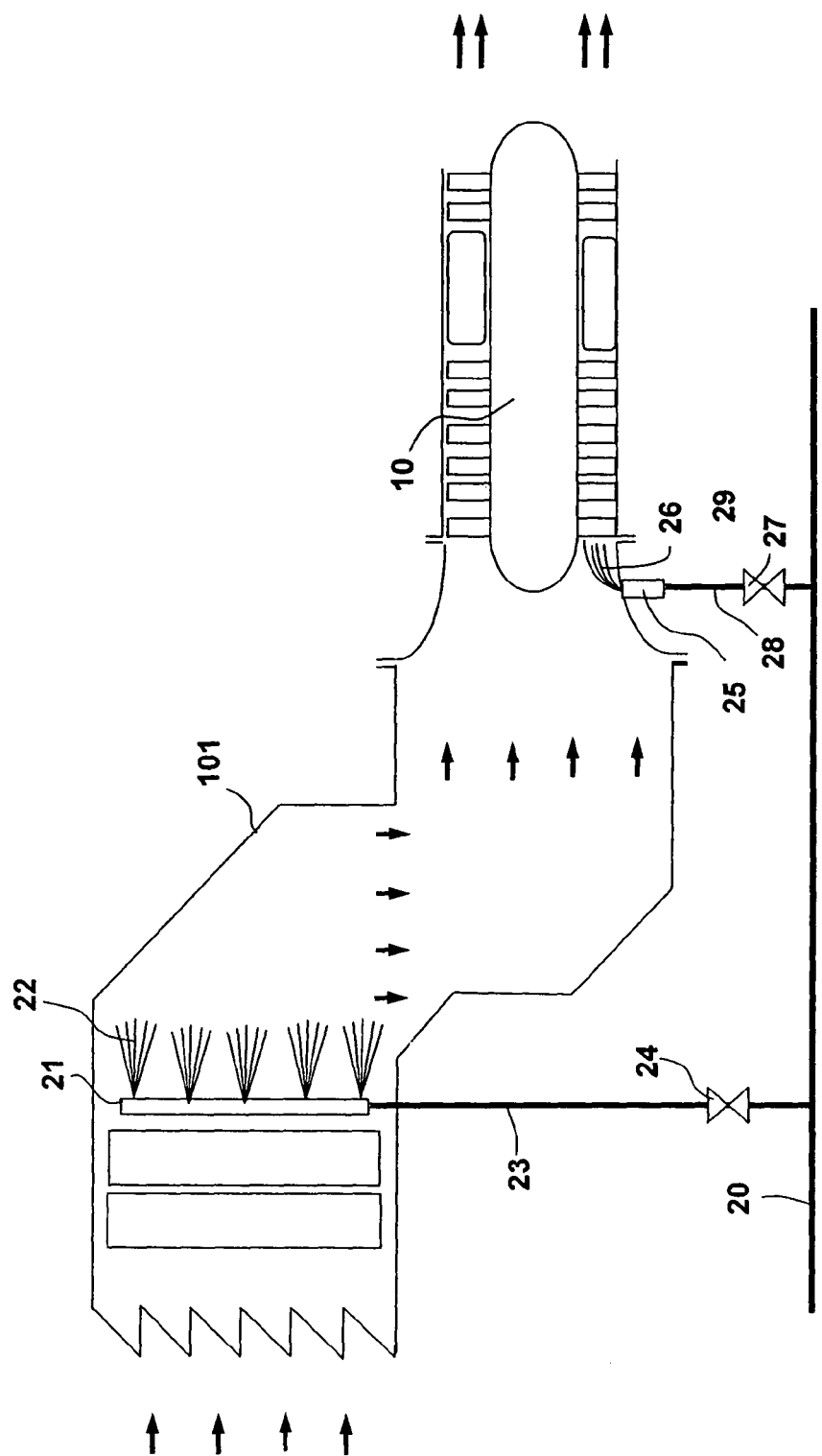
FIG. 4 depicts an exemplary diagram in accordance with an embodiment.

An exemplary evaporative cooling system is shown in FIG. 4. A pipe header 20 is connected to a conduit 23 via valve 24. When the valve 24 opens, high pressure water is fed to a nozzle holder 21, which is installed inside the duct and far upstream of the compressor inlet face. The nozzle holder 21 typically comprises a tube having multiple nozzles which atomize water into a spray 22 of fine droplets, for example, typically ranging from about 10 to about 20 microns, and more typically ranging from about 10 to about 15 microns. The droplets are the result of atomization, for example, typically at about 80 to about 140 bar pressure. The droplets are carried/suspended with the air stream and evaporate prior to entering the compressor as there is sufficiently long residence time for the air to travel from the nozzle tip to the compressor inlet. The evaporation exchanges water's latent heat for air sensible heat so that the air temperature is lowered by the evaporation. A lower air temperature corresponds to a higher density of the air, and therefore, a higher mass flow that results in a higher shaft output. The required water flow rate is set by the variable speed pump. The evaporative cooling operation is closed by shutting valve 24. U.S. Pat. No. 6,718,771 to Kopko illustrates an evaporative cooling system enabling gas turbine operations at high temperatures and is incorporated by reference herein in its entirety. The amount of water supplied to the nozzles is determined according to the control model generated by computational fluid dynamic analysis and regulated by the programmed logic controller.

Figure 5:
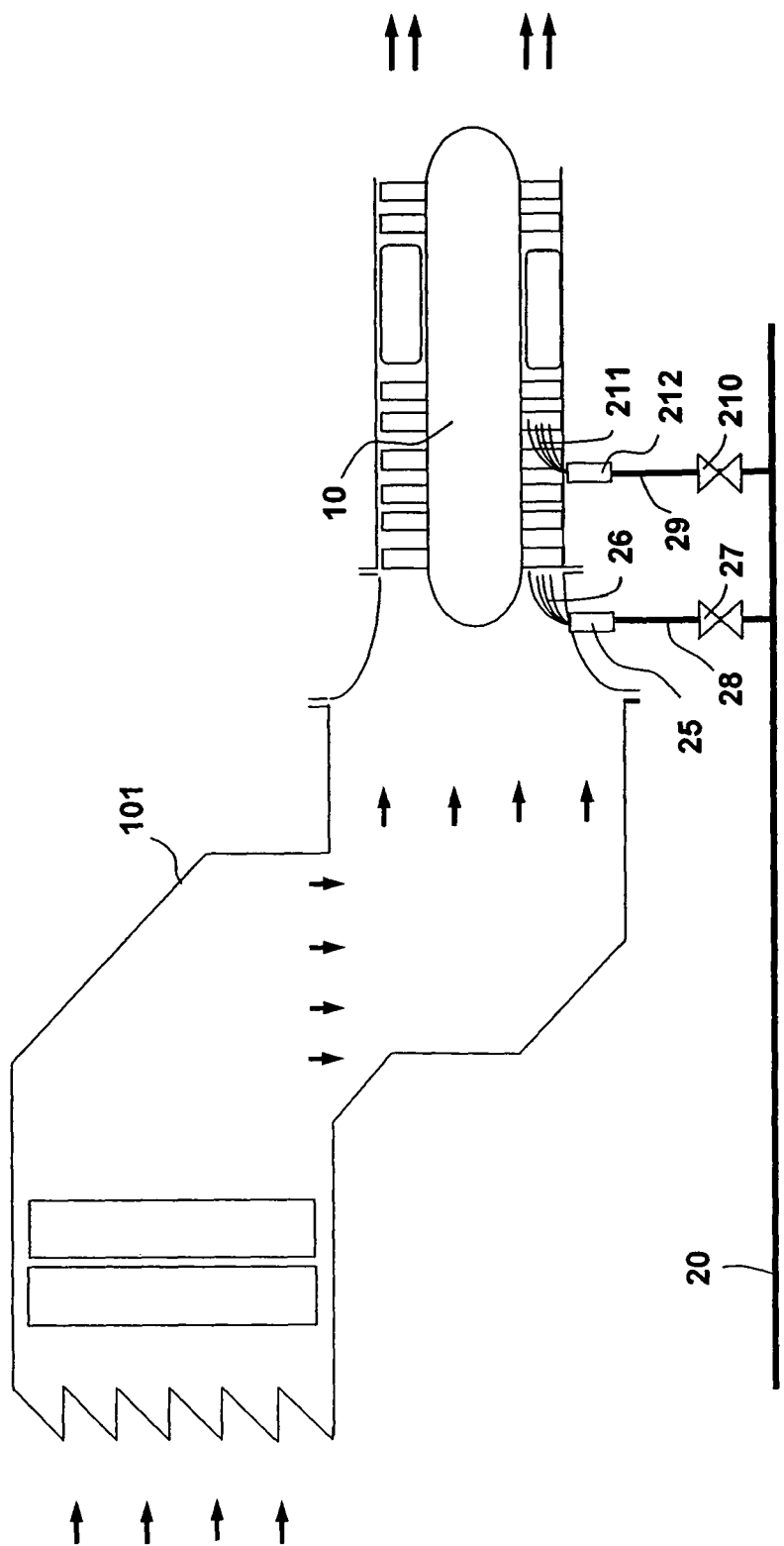
FIG. 5 depicts an exemplary diagram in accordance with an embodiment.

An exemplary compressor intercooling system is shown in FIG. 5. This system is a wet compression system, meaning that water in the form of small droplets evaporates inside the compressor during the compression work. The retention time for the air through a compressor is in the range of milliseconds. During this time the droplets evaporate as a result of the initial droplet size. The evaporative process is driven by the rapid temperature increase resulting from the compression work. In the exemplary system, a header 20 is connected to a conduit 29 via a valve 210. When the valve 210 opens, high pressure water is fed to at least one nozzle 212. The at least one nozzle 212 is installed to inject water into the compressor gas path (e.g., nozzles may be installed to inject water in between two disks). The at least one nozzle 212 atomizes the water into a spray 211 of small droplets, for example, ranging from about 10 to about 50 microns, and preferably in the range of about 10 to about 30 microns. The small droplet sizes result from atomization, preferably at about 10 to about 80 bar pressure, although other suitable bar pressure may also be utilized. The small droplets will evaporate before exiting the compressor. U.S. Pat. No. 6,644,935 to Ingistov describes an exemplary nozzle assembly for inter-stage compressor water injection, which is incorporated herein by reference in its entirety. The evaporation cools the air and thereby increases the air density, which increases mass flow and results in a higher power output. Additionally, the cooling of the compressor results in a lower compressor exit temperature, which means that cooler air is delivered to the combustor. This cooler air to the combustor means that more fuel can be fired while maintaining a constant firing temperature thereby providing an increase in the power output. The required water flow rate is set by the variable speed pump. To shut down the wet compression, operation valve 210 is closed. Alternatively nozzles for wet compression can be installed upstream of the compressor inlet. The principal operation will be the same as for the inter-stage mounted nozzles as per the description above. The amount of water supplied to the at least one nozzle is determined according to the control model generated by computational fluid dynamic analysis and regulated by the programmed logic controller.

Figure 6:
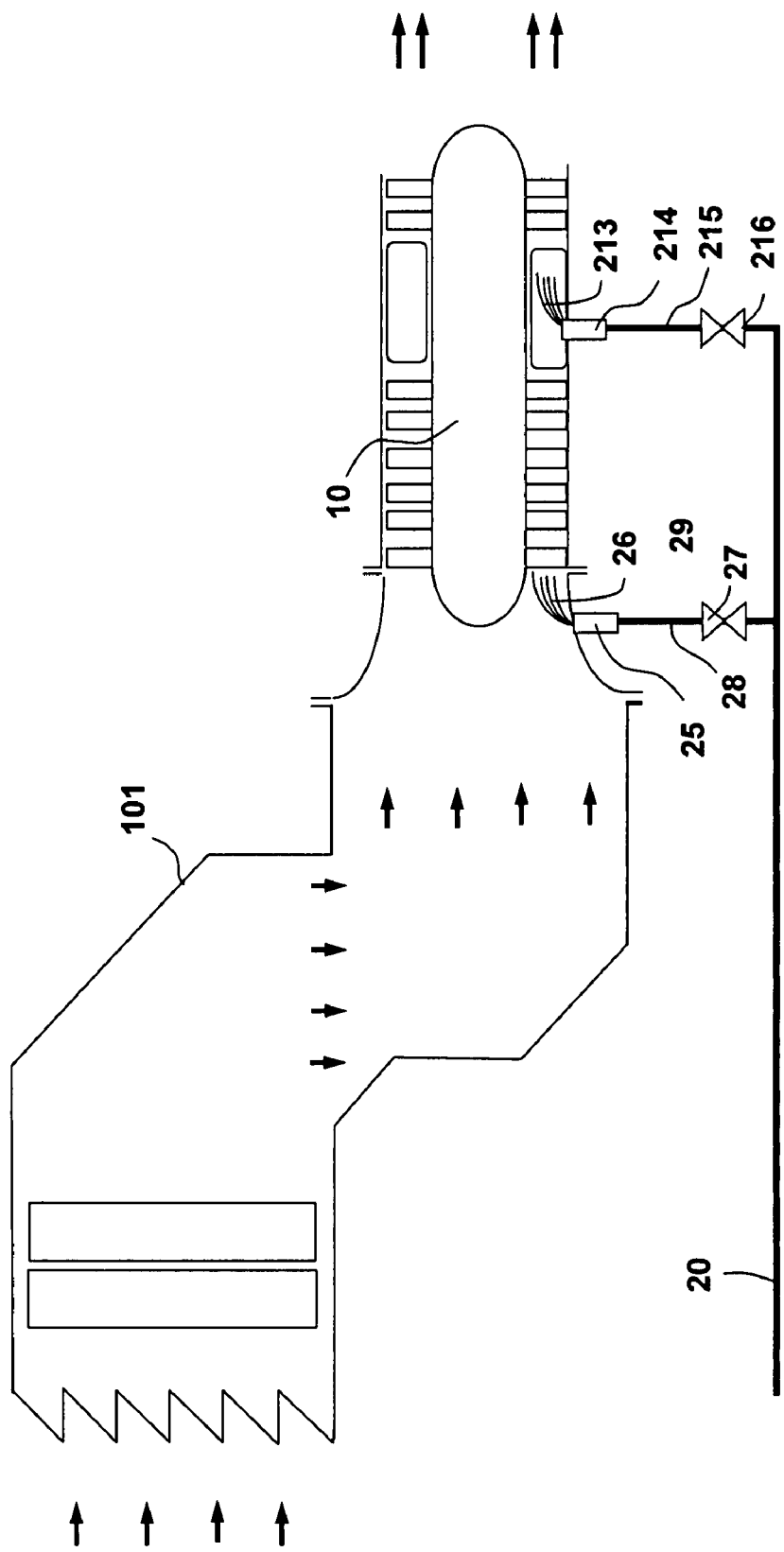
FIG. 6 depicts an exemplary line diagram in accordance with an embodiment.
Figure 7:
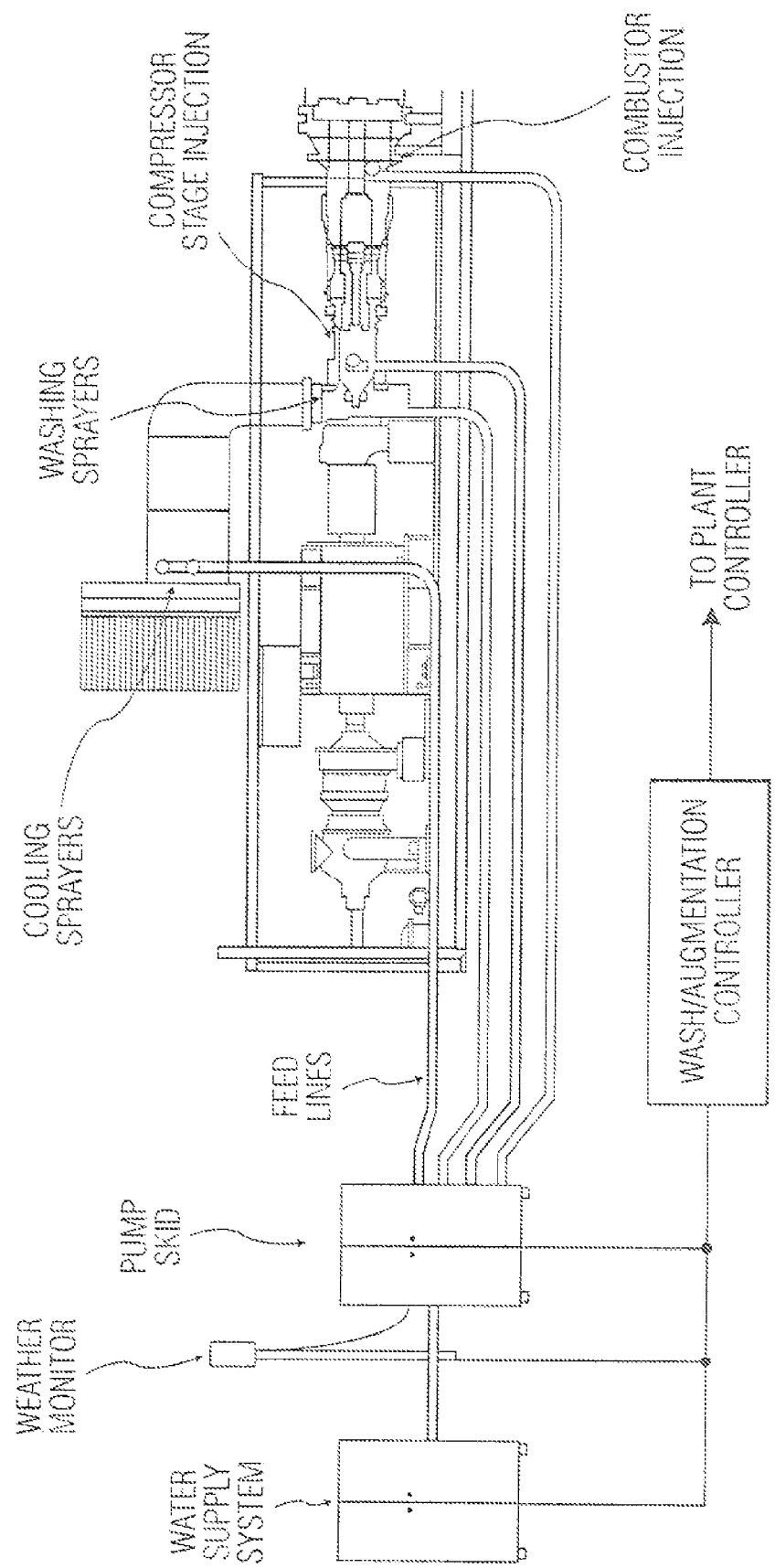
FIG. 7 depicts an exemplary diagram in accordance with an embodiment.

An exemplary combustor cooling system is shown in FIG. 6. The combustor cooling system comprises at least one nozzle for injecting droplets of water into the combustor. The water's latent heat is exchanged for flame sensible heat, thereby suppressing the flame's temperature. A header 20 is connected to a conduit 215 via a valve 216. The valve 216 opens and allows the feeding of high pressure water to the at least one nozzle 214. The at least one nozzle 214 atomizes the water into a spray 213. The spray 213 comprises droplets typically ranging in size from about 10 to about 50 microns, and more typically in the range of about 10 to about 30 microns. These droplets result from atomizing at about 100 to about 200 bar pressure. As should be understood, alternative size droplets and/or atomizing at other pressures may also be utilized as may be desired. The flame evaporates the water to form steam. The steam expands through the turbine, thus contributing to the mass flow and providing a power augmenting effect. Further, as the flame temperature is suppressed more fuel can be fired while maintaining a constant firing temperature. Firing more fuel provides additional power output. The required water flow rate is set by the variable speed pump. To shut down the combustor cooling, valve 216 is closed. The amount of water supplied to the at least one nozzle is determined according to the control model generated by computational fluid dynamic analysis and regulated by the programmed logic controller. U.S. Pat. No. 3,976,661 to Cheng is an example of power augmentation effects by injecting into the combustor and is incorporated herein by reference in its entirety.

Figure 8:
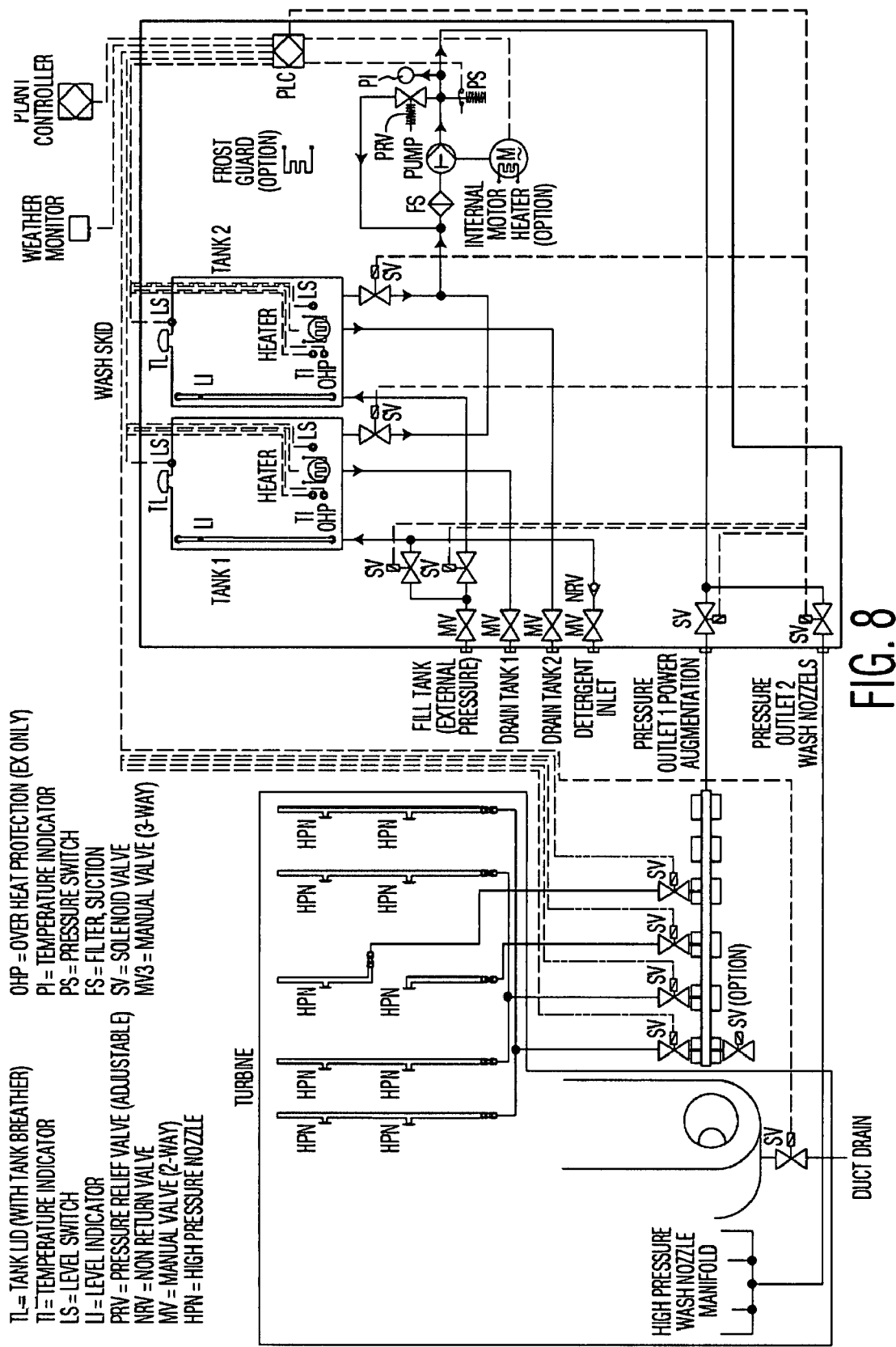
FIG. 8 depicts an exemplary line diagram in accordance with an embodiment.

Now referring to FIG. 8, a further feature of the overall power augmentation and wash system is the use of a computer or PLC data logger to monitor the performance change from power augmentation and/or water washing. Ambient weather conditions and power plant performance data are collected to allow preparation of performance trend data to show before and after conditions. This data may be helpful to certify the economic performance and assure proper, expected operation of the power augmentation and/or wash system. Using this data, faulted conditions may be detected and acted upon. Transmittal of this data using any suitable communication platform, such as a common cell phone internet connection, is provided for in the data logging system.

An injection array system 900 may be connected to the control unit 202. The injection array system 900 may be pre-filled prior to power augmentation of the gas turbine, which may be managed by the control unit 202. The injection array system 900 may be a nozzle array.

Figure 9:
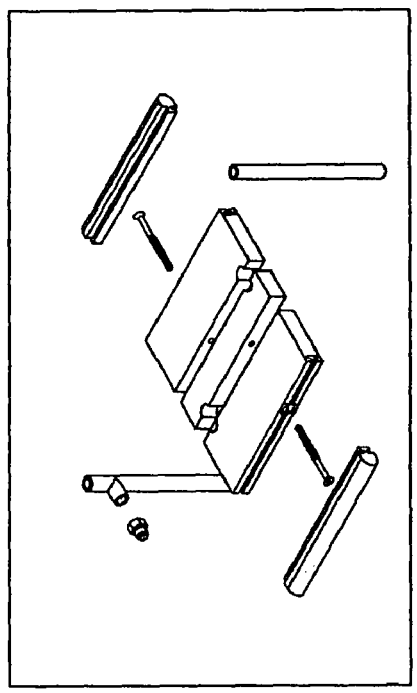
FIGS. 9, 9a, 9b, and 9c depict exemplary diagrams of an injection array and captivation of nozzles and structure.
Figure 9:
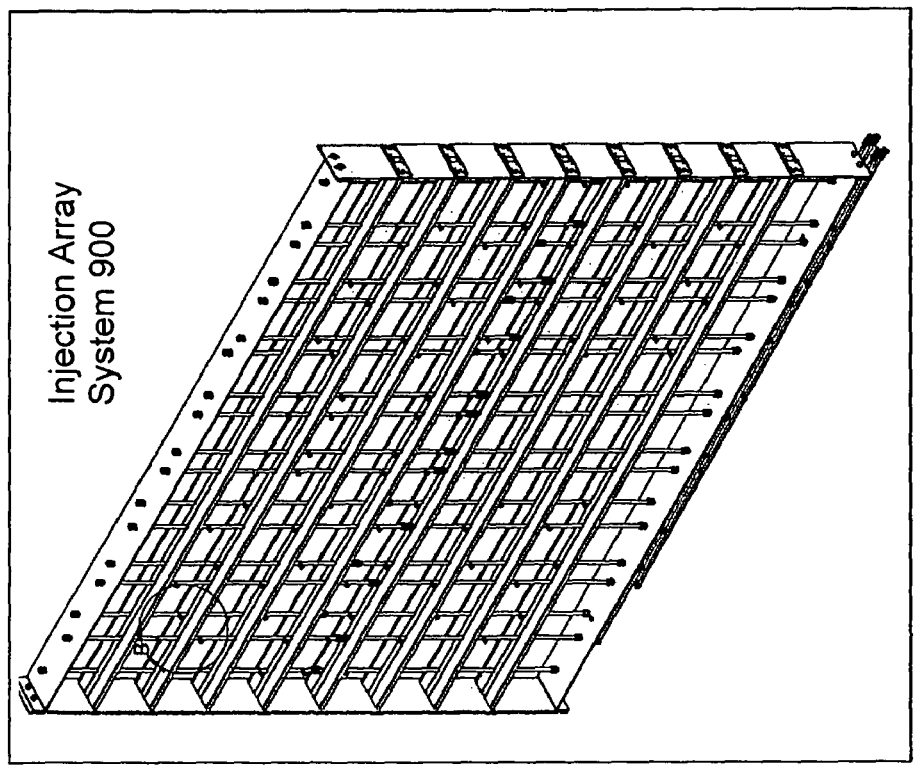
Figure 9A:
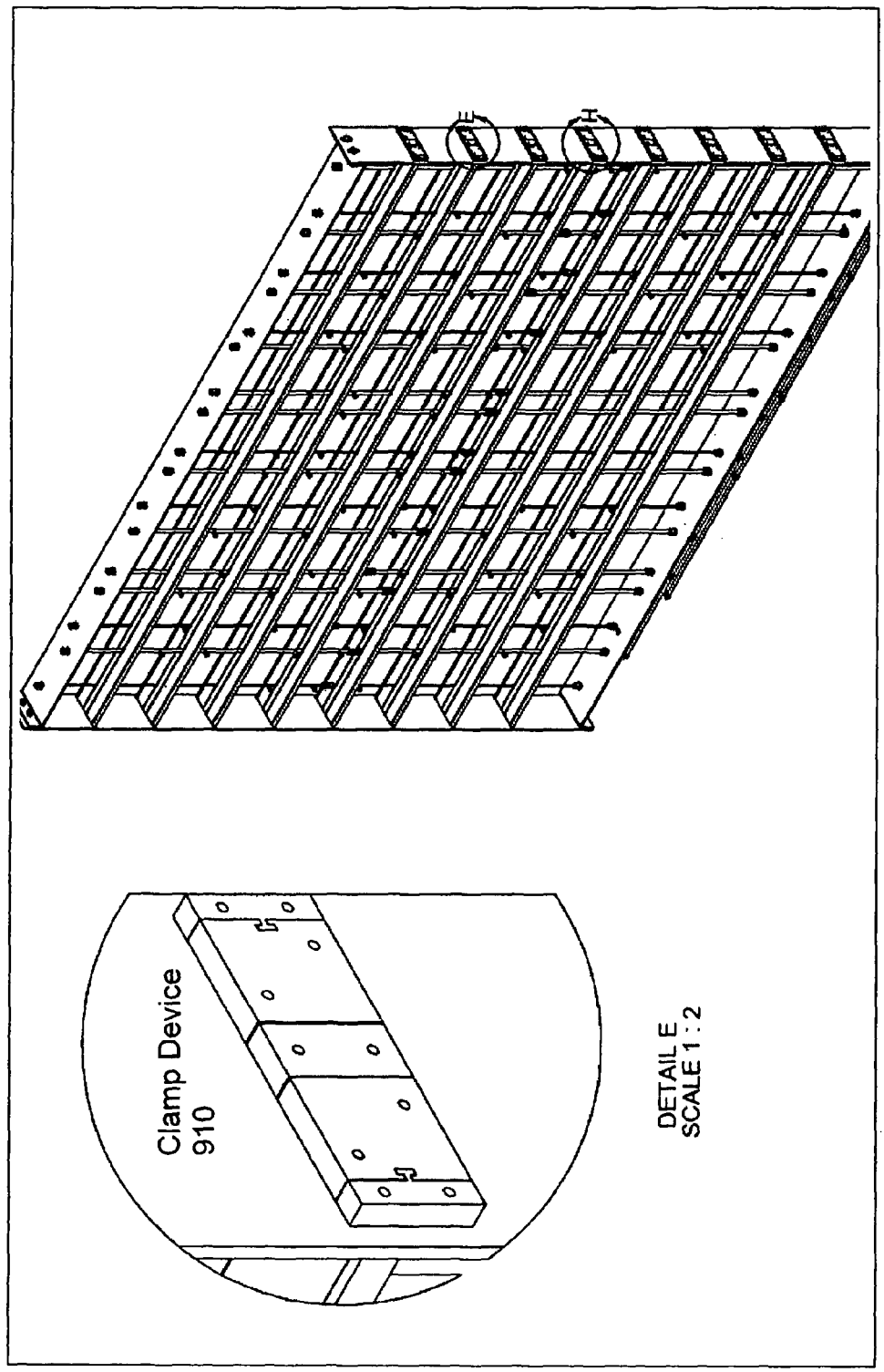
Figure 9B:
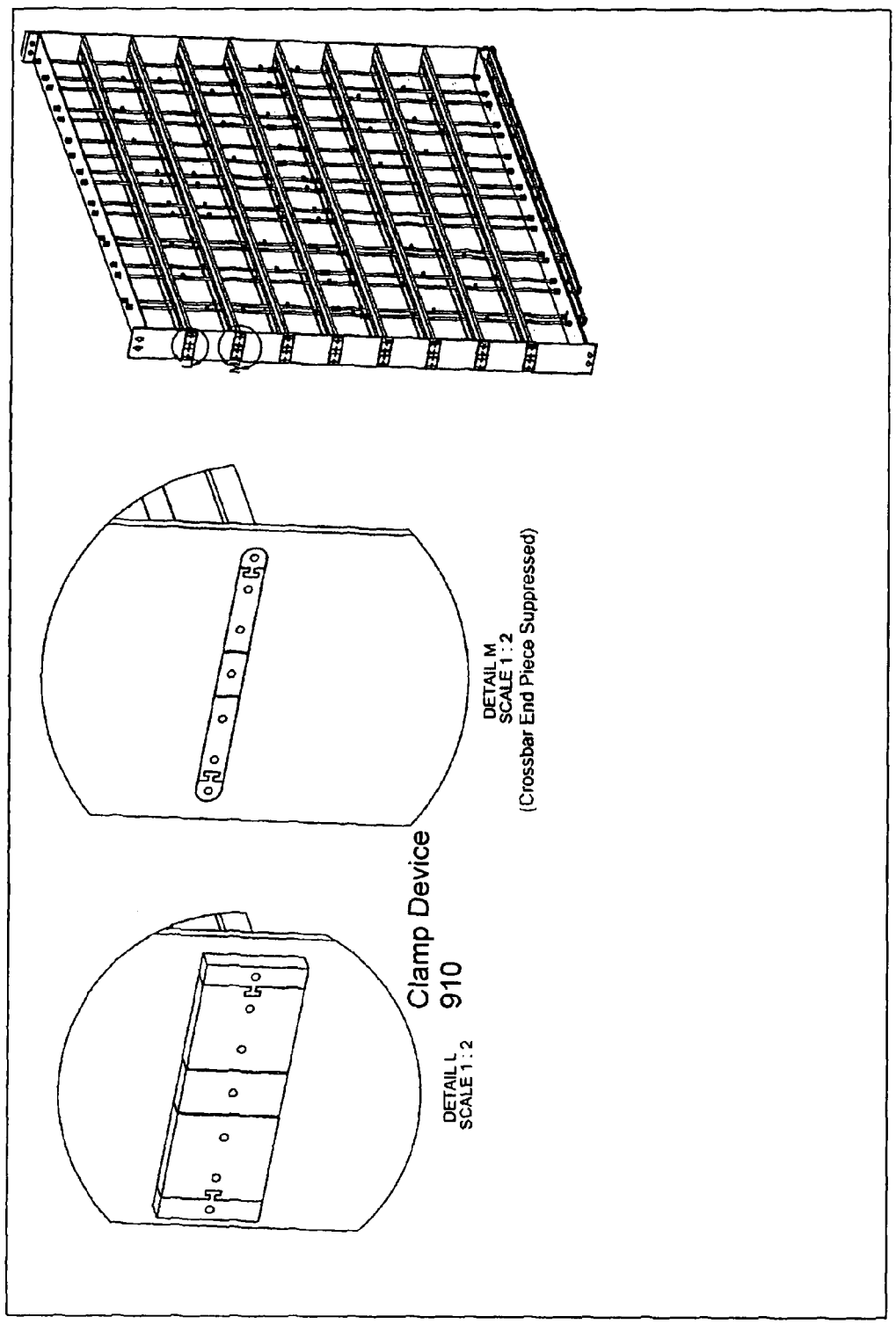
Figure 9C:
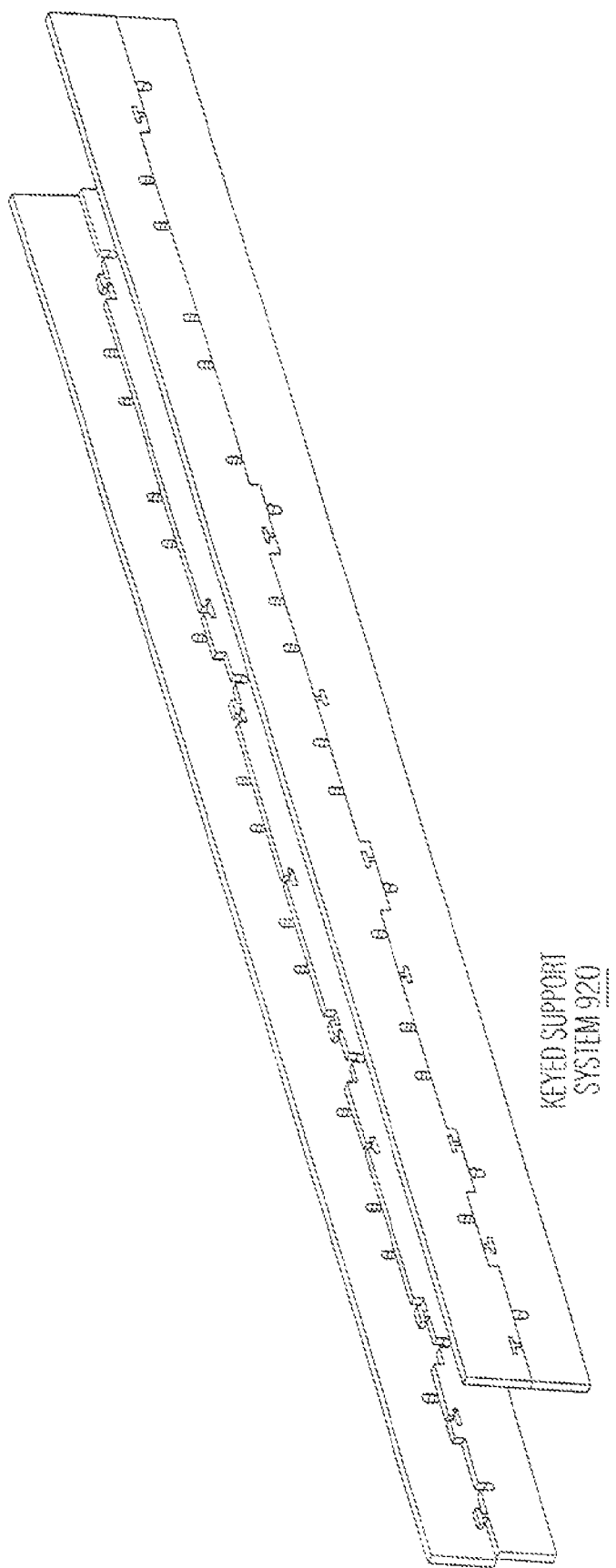

The power augmentation injection array system 900 may be contained using a clamp device 910, as shown in FIGS. 9, 9a, and 9b. The clamp device 910 may be a nozzle holder positioned upstream of a compressor inlet face. The clamp device 910 may be fully contained with a fitted bar arrangement secured outside filter house walls to prevent foreign material from being released. As shown in FIG. 9c, a keyed support system 920 may be utilized to support the injection array system 900. In one embodiment, the keyed support system 920 may advantageously introduce cost advantages by water jetting fabrication.

Figure 10:
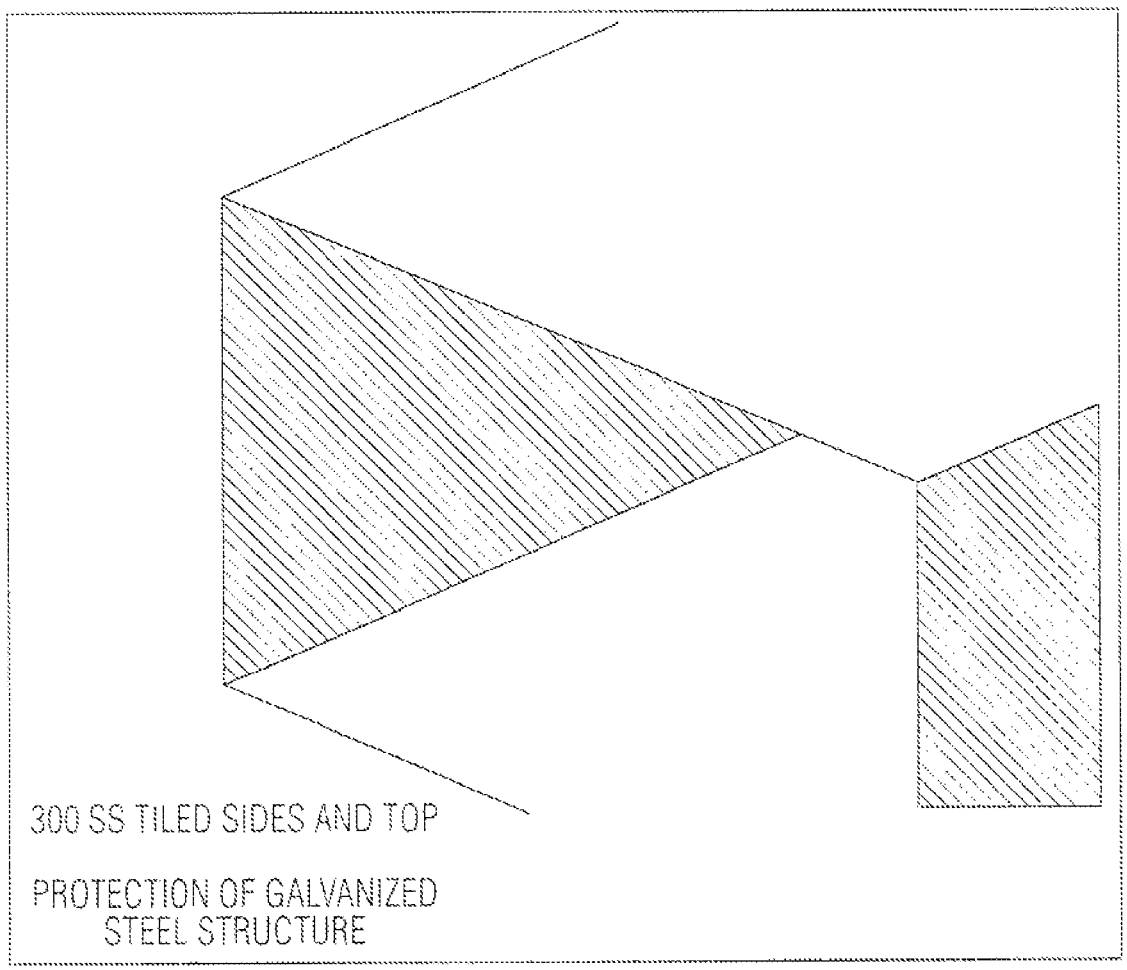
FIG. 10 depicts an exemplary diagram of an inlet corrosion protection and compressor guttering.
Figure 11:
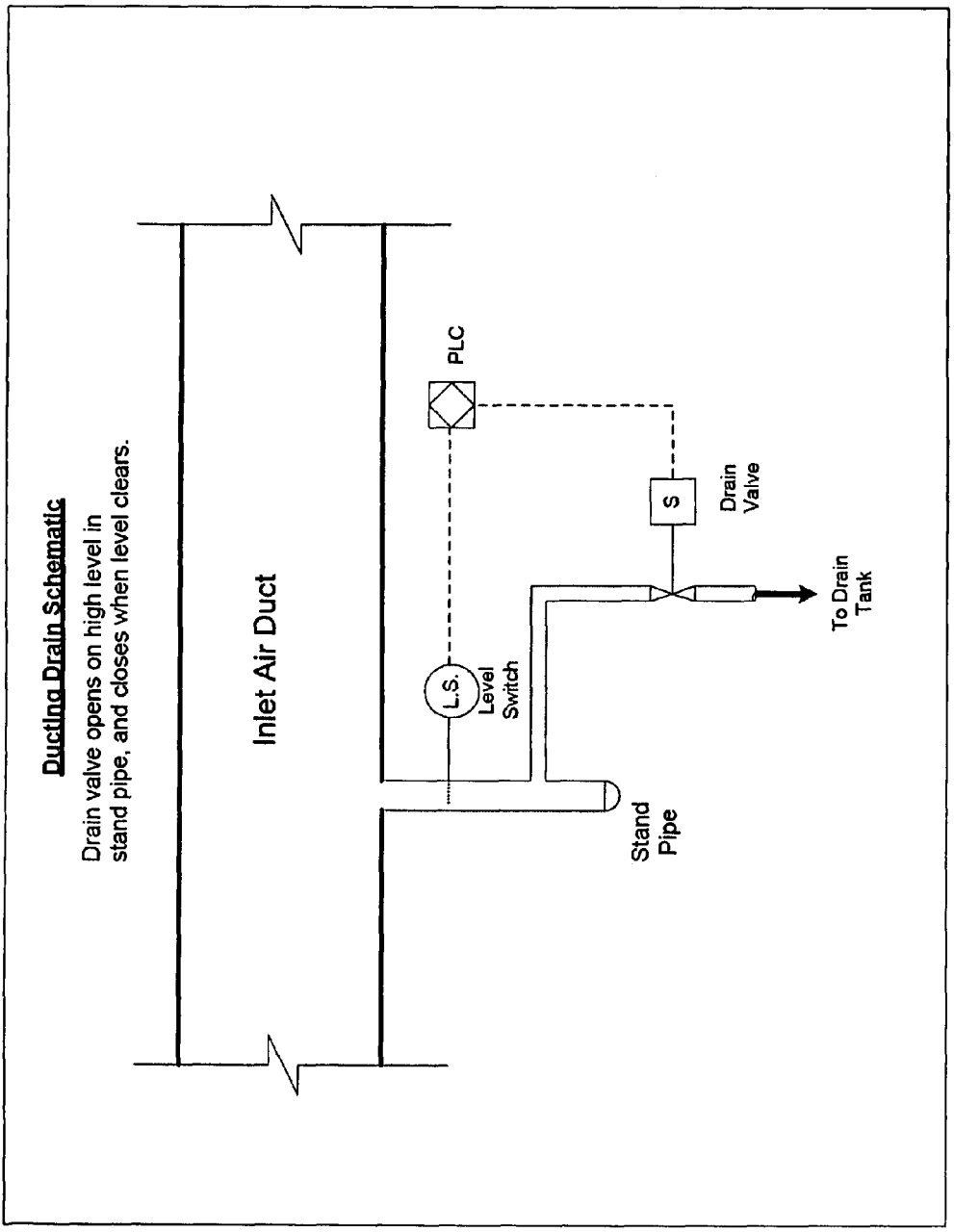
FIG. 11 depicts an exemplary diagram of an inlet drain valve.

The clamp may ensure full captivation of all array elements. A second clamp on the outside of the filter house inlet wall captivates the array support bars. For power augmentation to full saturation, some water condenses on the filter house walls. To protect carbon steel or galvanized steel, the filter house walls may be coated with a protective water proof coating and the coating may be captured with a corrosion resistant tile, such as, for example, a stainless steel tile. The tiles may be held in place with mechanical fasteners connected through the filter house wall, as shown in FIG. 10. Additional condensate control is provided with appropriately sized gutters around structures in the inlet and the inlet bell mouth. These gutters direct water to the floor of the inlet where a drain with an accumulator and level sensing allows for draining of collected condensate. These features are illustrated in FIGS. 10 and 11.

Gutters are J-shaped structures that form a circle around the bell mouth opening to the compressor or around structures within the inlet. The gutters capture flowing water on the interior inlet walls in a manner that prevents the water from flowing into the compressor. Particularly, the gutter directs the water to the floor of the inlet and towards the inlet drain. As the water gathers about the inlet drain, the accumulator in the drain will collect the fluid water and when the fluid level reaches the level of the sensor, the sensor activates the solenoid valve to drain the accumulated fluid.

Embodiments also relate to a method for augmenting power output from a gas turbine engine comprising a turbine inlet duct and a gas turbine including a combustor and a compressor having at least one compressor blade. The method comprises: (1) increasing a water pressure using a pump unit comprising at least one variable speed pump; (2) controlling a speed of the pump unit using a control unit connected to the pump unit by a signal feed, wherein the control unit regulates the operation of the pump unit according to predetermined cycle deck and computational fluid dynamic analysis based on the inputting of at least one defined parameter to form a control model; (3) supplying an amount of water to either (a) a washing unit connected to the pump unit by a feed line, and/or (b) at least one injection unit connected to the pump unit by the feed line; (4) controlling a flow rate of water being supplied to the at least one nozzle of the washing unit or the at least one injection unit using a valve; (5) emitting a spray of atomized water droplets from the at least one nozzle of the washing unit so as to impinge on and wet the at least one compressor blade, thereby obtaining a release of fouling material from the at least one compressor blade, the atomized water droplets injected at a velocity being sufficiently high to penetrate said air stream produced during operation of said engine; (6) injecting a spray of atomized water from at least one nozzle of the at least one water injection unit into an air stream of the turbine inlet duct or at the gas turbine, thereby increasing a mass flow of the air stream, wherein the power output from the gas turbine engine is augmented, wherein typically substantially all droplets of the spray evaporate prior to entering the compressor; and (7) monitoring environmental conditions using a weather monitoring unit by measuring at least one of a dry bulb temperature device; measuring an air pressure; measuring an air humidity; and measuring a wet bulb temperature, wherein the monitored conditions are communicated to the control unit by a second signal.

The method can further include step (8) collecting water emanating from the gas turbine engine using a water collecting unit connected to the pump unit by a conduit and purifying the water using a water processing unit.

The method can be performed off-line and wherein the at least one nozzle of the washing unit is positioned upstream of the compressor and is directed into an inlet of the compressor. From this position, the water can be injected into the compressor gas path. Similarly, at least one nozzle of the at least one injection unit can be positioned adjacent to the combustor.

Alternatively, a method in accordance with embodiments can be performed on-line, where an exemplary on-line washing system is described below. During on-line washing the engine is firing fuel while the rotor spins at high speeds and the air enters the compressor at high velocity. As shown in FIGS. 2-6, a conduit 28 is connected to a header 20 by a valve 27. When the valve 27 opens, high pressure water is fed to at least one nozzle 25, wherein the water has a nozzle exit velocity of about 40 meters/second. The at least one nozzle 25 is installed upstream of the compressor inlet face. The nozzle 25 atomizes the water into a spray 26. The nozzle 25 is essentially directed towards the compressor inlet. This high velocity spray will penetrate into the high velocity air stream. The spray is carried with the air stream into the compressor. Inside the compressor the droplets impinge on the at least one compressor blade and vane, thereby wetting them. Wetting of at least one blade and vane releases fouling material, thereby cleaning the compressor. Cleaning results in a reduced boundary layer thickness, which increases the mass flow. The increase in mass flow increases the engine power output. The spray 26 comprises droplets in the size range of about 80 to about 250 microns, and preferably in the range of about 80 to about 180 microns. The droplet size is the result of atomization at a pressure of about 10 to about 80 bar. The required water flow rate is set by the variable speed pump. To shut down the wash operation the valve 27 is closed.

An embodiment of the off-line washing system is described below. The same set of nozzles in this embodiment is used for off-line washing as for on-line washing. During off-line washing the engine is not firing fuel. A conduit 28 is connected to a header 20 by a valve 27. When the valve 27 opens, high pressure water is fed to at least one nozzle 25. The at least one nozzle 25 is installed upstream of the compressor inlet face. The nozzle 25 is essentially directed towards the compressor inlet. The nozzle 25 atomizes the water into a spray 26. As the at least one nozzle is essentially directed towards the compressor inlet, water droplets enter the compressor. These droplets are of suitable size as to impinge on the at least one compressor blade and vane, thereby wetting them. Wetting of the blades and vanes releases the fouling material, thereby cleaning the compressor. Cleaning results in a reduced boundary layer thickness when the engine is operating. A reduced boundary layer thickness increases the mass flow. The increase in mass flow increases the engine power output. The spray 26 comprises droplets in the size range of about 80 to about 250 microns (on a means mass basis), and preferably in the range of about 80 to about 180 microns. The droplet size is the result of atomization at a pressure of about 10 bar to about 80 bar. The required water flow rate is set by the variable speed pump. To shut down the wash operation a valve 27 is closed. Alternatively, a different set of nozzles may be used for off-line washing although the principal operation will be as described above.

In addition, the use of water reduces the fuel consumption. The reduced fuel consumption is the result of gas turbine components such as the compressor and the turbine operating more efficiently.

An aspect of embodiments is the flexibility to turn on and off systems according to what is most operationally advantageous. It is possible to swiftly activate one system and deactivate another system when desired as shown in the Examples.

It should be noted that although the present disclosure is described in terms of "preferred" embodiments, the above-described embodiments are merely examples, and serve to set forth a clear understanding of the present disclosure. There are many modifications, permutations, and equivalents which may be made to these embodiments without departing from the spirit of the present disclosure. It is therefore intended that the following claim set be interpreted to include all such modifications, permutations, and equivalents that fall within the scope and spirit of the present disclosure.

The invention claimed is:
1. A system for augmenting power output from a gas turbine, the system comprising:
 (a) a pump unit;
 (b) a control unit connected to the pump unit, the control unit regulating the operation of the pump unit according to a predetermined cycle deck and computational fluid dynamic analysis transfer function based on at least one defined parameter to form a control model;
 (c) an injection array system connected to the control unit, the injection array system being pre-filled prior to power augmentation of the gas turbine;
 (d) a washing unit connected to the pump unit, the washing unit comprising at least one nozzle and at least one valve for controlling a water flow rate fed to the at least one nozzle;
 (e) at least one water injection unit connecting to the pump unit, the at least one water injection unit comprising at least one nozzle and at least one valve for controlling a water flow rate fed to the at least one nozzle;
 (f) a weather monitoring unit connected to the control unit, wherein the weather unit indicates at least one of the at least one defined parameters;
 (g) a computing system connected to the control unit, wherein the computing system tracks and reports performance data;
 (h) a water collecting unit connected to said pump unit by a conduit and adapted to collect water emanating from the gas turbine engine; and
 (i) a water processing unit connected to the water collecting unit, wherein the water processing unit is adapted to purify said collected water.

2. A system for augmenting power output from a gas turbine, the system comprising:
 (a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the control unit comprises a control, a storage means and a programmed logic controller, each connected to the control unit by a signal feed, wherein the programmed logic controller regulates the pump unit to schedule an amount of water for washing or power augmentation.

3. The system according to claim 2, wherein the control unit calculates a water flow rate for full saturation based upon a calculation of air flow rate and target relative humidity on an open loop basis to converge to a specific flow rate determined by the cycle deck.

4. The system according to claim 2, wherein the injection array system comprises a nozzle array, wherein the nozzle array is pre-filled prior to power augmentation initiation.

5. A system for augmenting power output from a gas turbine, the system comprising:

(a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the control unit is connected to an operator unit by a signal feed.

6. A system for augmenting power output from a gas turbine, the system comprising:

(a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the at least one nozzle of the at least one water injection unit is coupled to a nozzle holder, wherein the nozzle holder is positioned upstream of a compressor inlet face, and a valve connected to the nozzle holder by a conduit, and wherein the at least one nozzle injects a spray of atomized water into an air stream of the turbine inlet duct such that substantially all droplets of the spray evaporate prior to entering the compressor, and wherein the nozzle holder is a clamp device, wherein the clamp device is fully contained with a fitted bar arrangement secured outside filter house walls to prevent foreign material from release.

7. A system for augmenting power output from a gas turbine, the system comprising:

(a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the at least one water injection unit comprises at least one nozzle positioned adjacent to the combustor.

8. A system for augmenting power output from a gas turbine, the system comprising:

(a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the wash unit further comprises a reverse osmosis unit.

9. The system according to claim 8, wherein the revere osmosis unit provides an amount of water having a total dissolved solids ranging from about 1 to about 5 ppm.

10. A system for augmenting power output from a gas turbine, the system comprising:

(a) a pump unit;

(b) a control unit connected to the pump unit, the control unit regulating the operation of the pump unit according to a predetermined cycle deck and computational fluid dynamic analysis transfer function based on at least one defined parameter to form a control model;

(c) an injection array system connected to the control unit, the injection array system being pre-filled prior to power augmentation of the gas turbine;

(d) a washing unit connected to the pump unit, the washing unit comprising at least one nozzle and at least one valve for controlling a water flow rate fed to the at least one nozzle;

(e) at least one water injection unit connecting to the pump unit, the at least one water injection unit comprising at least one nozzle and at least one valve for controlling a water flow rate fed to the at least one nozzle;

(f) a weather monitoring unit connected to the control unit, wherein the weather unit indicates at least one of the at least one defined parameters; and (g) a computing system connected to the control unit, wherein the computing system tracks and reports performance data, wherein the injection array system is supported by a keyed support system.

11. A method for augmenting power output from a gas turbine engine comprising an inlet duct and a gas turbine that comprises a combustor and a compressor having at least one compressor blade, the method comprising the steps of:

(1) increasing a water pressure using a pump unit comprising at least one variable speed pump;

(2) controlling a speed of the pump unit using a control unit connected to the pump unit by a signal feed, wherein the control unit regulates the pump unit according to predetermined computational fluid dynamic analysis based on inputting at least one defined parameter to form a control model;

(3) supplying water to either;

(a) a washing unit connected to the pump unit by a feed line, or (b) at least one injection unit connected to the pump unit by the feed line, wherein the water supply is controlled using a programmed logic controller;

(4) controlling a flow rate of water being supplied to at least one nozzle of the washing unit or at least one injection unit using a valve;

(5) emitting a spray of atomized water droplets from the at least one nozzle of the washing unit so as to impinge on and wet the at least one compressor blade, thereby obtaining a release of fouling material from the at least one compressor blade;

(6) pre-filling an array system connected to the control unit to allow initiation of power augmentation injection, wherein the power augmentation injection is free of a power surge;

(7) injecting a spray of atomized water from at least one nozzle of the at least one water injection unit into an air stream of the turbine inlet duct or at the gas turbine, thereby increasing a mass flow of the air stream, wherein the power output from the gas turbine engine is augmented;

(8) monitoring environmental conditions using a weather monitoring unit, wherein the monitored conditions are communicated to the control unit by a second signal; and (9) collecting water emanating from the gas turbine engine using a water collecting unit connected to the pump unit by a conduit and purifying the water using a water processing unit.

12. A method for augmenting power output from a gas turbine engine comprising an inlet duct and a gas turbine that comprises a combustor and a compressor having at least one compressor blade, the method comprising the steps of:

(1) increasing a water pressure using a pump unit comprising at least one variable speed pump;

(2) controlling a speed of the pump unit using a control unit connected to the pump unit by a signal feed, wherein the control unit regulates the pump unit according to predetermined computational fluid dynamic analysis based on inputting at least one defined parameter to form a control model;

(3) supplying water to either;

(a) a washing unit connected to the pump unit by a feed line, or (b) at least one injection unit connected to the pump unit by the feed line, wherein the water supply is controlled using a programmed logic controller;

(4) controlling a flow rate of water being supplied to at least one nozzle of the washing unit or at least one injection unit using a valve;

(5) emitting a spray of atomized water droplets from the at least one nozzle of the washing unit so as to impinge on and wet the at least one compressor blade, thereby obtaining a release of fouling material from the at least one compressor blade;

(6) pre-filling an array system connected to the control unit to allow initiation of power augmentation injection, wherein the power augmentation injection is free of a power surge;

(7) injecting a spray of atomized water from at least one nozzle of the at least one water injection unit into an air stream of the turbine inlet duct or at the gas turbine, thereby increasing a mass flow of the air stream, wherein the power output from the gas turbine engine is augmented;

(8) monitoring environmental conditions using a weather monitoring unit, wherein the monitored conditions are communicated to the control unit by a second signal; and (9) collecting water emanating from the gas turbine engine using a water collecting unit connected to the pump unit by a conduit and purifying the water using a water processing unit, wherein a faulted condition is detected using a relationship between predicted flow and actual flow to detect blocked nozzle and/or system leaks.

13. A method for augmenting power output from a gas turbine engine comprising an inlet duct and a gas turbine that comprises a combustor and a compressor having at least one compressor blade, the method comprising the steps of:

(1) increasing a water pressure using a pump unit comprising at least one variable speed pump;

(2) controlling a speed of the pump unit using a control unit connected to the pump unit by a signal feed, wherein the control unit regulates the pump unit according to predetermined computational fluid dynamic analysis based on inputting at least one defined parameter to form a control model;

(3) supplying water to either;

(a) a washing unit connected to the pump unit by a feed line, or (b) at least one injection unit connected to the pump unit by the feed line, wherein the water supply is controlled using a programmed logic controller;

(4) controlling a flow rate of water being supplied to at least one nozzle of the washing unit or at least one injection unit using a valve;

(5) emitting a spray of atomized water droplets from the at least one nozzle of the washing unit so as to impinge on and wet the at least one compressor blade, thereby obtaining a release of fouling material from the at least one compressor blade;

(6) pre-filling an array system connected to the control unit to allow initiation of power augmentation injection, wherein the power augmentation injection is free of a power surge;

(7) injecting a spray of atomized water from at least one nozzle of the at least one water injection unit into an air stream of the turbine inlet duct or at the gas turbine, thereby increasing a mass flow of the air stream, wherein the power output from the gas turbine engine is augmented;

(8) monitoring environmental conditions using a weather monitoring unit, wherein the monitored conditions are communicated to the control unit by a second signal; and (9) collecting water emanating from the gas turbine engine using a water collecting unit connected to the pump unit by a conduit and purifying the water using a water processing unit, wherein the at least one water injection unit comprises at least one nozzle positioned adjacent to the combustor and a valve connected to the nozzle via a conduit and adapted to control a flow rate of water being fed to the nozzle.

* * * * *